(12) United States Patent
Dobler et al.

(10) Patent No.: US 7,239,239 B2
(45) Date of Patent: Jul. 3, 2007

(54) DIALOG SYSTEM FOR WARNING AND INFORMATION SYSTEMS

(75) Inventors: Günter Dobler, Altbach (DE); Markus Hess, Baltmannsweiler (DE); Wilhelm Kincses, Esslingen (DE); Siegfried Rothe, Denkendorf (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/318,616

(22) Filed: Dec. 13, 2002

(65) Prior Publication Data

US 2003/0117291 A1 Jun. 26, 2003

(30) Foreign Application Priority Data

Dec. 13, 2001 (DE) ................................ 101 61 261

(51) Int. Cl.
  *G08B 21/00* (2006.01)
(52) U.S. Cl. ...................................... 340/540; 340/438
(58) Field of Classification Search ................ 340/576, 340/436, 439, 438, 540, 693.1, 286.02; 246/1 C
  See application file for complete search history.

(56) References Cited

U.S. PATENT DOCUMENTS

| 4,359,725 | A | * | 11/1982 | Balogh et al. | .............. 340/576 |
| 5,012,226 | A | * | 4/1991 | Love | ........................... 340/576 |
| 5,521,580 | A | * | 5/1996 | Kaneko et al. | ............. 340/439 |
| 5,684,455 | A | * | 11/1997 | Williams et al. | ............ 340/439 |
| 5,694,116 | A | * | 12/1997 | Kojima | ....................... 340/576 |
| 6,154,123 | A | * | 11/2000 | Kleinberg | ................... 340/436 |
| 6,184,791 | B1 | * | 2/2001 | Baugh | ........................ 340/576 |

* cited by examiner

*Primary Examiner*—Brent A. Swarthout
(74) *Attorney, Agent, or Firm*—Akerman Senterfitt; Stephan A. Pendorf; Yonghong Chen

(57) ABSTRACT

In order to make warning devices more efficient, it is known to design parameters to be variable and therewith to be adaptable depending upon the state or condition of a user of the warning information. Herein, for example, warning start points are changed or multi-stage warnings are engineered depending upon urgency. The disadvantage of such an adaptive system can however reside therein, that the mechanistic detection of the condition of the operator using various sensor systems and the subsequent output to the operator or the operator assistant system is not always acceptable, which can irritate the vehicle operator or occupants. In order to increase the acceptance by the user of the warning information it is proposed that in the lead-up to a planned change in the mode and manner of the output of the warning information, communication is initiated with at least one of the users. In the framework of this communication a user can indicate his acceptance or declining with respect to the planned change.

16 Claims, 1 Drawing Sheet

DIALOG SYSTEM FOR WARNING AND INFORMATION SYSTEMS

BACKGROUND OF THE INVENTION

1. Field of the Invention

The invention concerns a process and a device according to the precharacterizing portion of patent claims 1 and 11.

2. Description of the Related Art

In order to enhance traffic safety, major automobile manufacturers, universities and institutions worldwide have carried out research in order to find process and means for recognizing the alertness or condition of the vehicle operator—in particular for recognition of conditions leading to attention deficits, such as fatigue—and for recognition of operator task loading and demands upon the operator, in order to optimally influence the operator. These efforts are made with the primary objective of informing the vehicle operator regarding his condition using various media (that is—acoustically, optically, haptically and olfactorally), or to warn the operator or even to resort to operator assistance systems to influence the vehicle dynamics.

With regard to the warning and information functions of such systems, it is conceivable that a number of the following parameters could be set up to be variable and therewith be designed to be adaptable depending upon the condition of the vehicle operator:

- changing time of warning onset
- multistage or stepped warnings according to the conceived urgency
- change of the output medium and thereby change of the sensory organ being influenced
- audio amplification and frequency change in the case of acoustic warning signals
- intensity and frequency changes in the case of optical signals
- amplification or reduction of tactile or haptic oscillations and feedback
- suppression of lower priority warning signals and information
- changing the feedback from the steering wheel (increasing or decreasing resistance to rotation)
- movement of the braking, acceleration and steering initiation points.

A warning and information system having such a design is known for example from the subsequently published DE 10103401 (WO 02/058962 A1). The disadvantage of such an adaptive system can however be, that the detection of the condition of the operator based on mechanistic recognition using varying sensor systems and the subsequent mode and manner of the output of the warning information generated therefrom may not always be well received by the vehicle operator and could in fact be irritating not only to the vehicle operator but also to the other vehicle occupants.

SUMMARY OF THE INVENTION

The task of the invention is to provide a process according to the precharacterizing portion of patent claim 1, of which the degree of acceptance by the user of the warning information is elevated in comparison to systems known from the state of the art.

It is a further task of the invention to provide a suitable device for carrying out the process, according to the precharacterizing portion of patent claim 11.

This first task is solved by a process for controlling a warning system which, with respect to the mode and manner of the output of its warning information, is dynamically adaptable to the behavior or the condition of one or more users of this information or the situation prevailing in the environment of the system. For this, in inventive manner, leading-up to or preliminary to a planned change in the type and manner of the output of the warning information, communication is established with at least one of the users. In the framework of this communication the user can express or register acceptance or declining with respect to the planned change.

The further task is solved by a device for controlling a warning system, which utilizes a unit for output of warning information and a unit for adaptation of the type and mode of the output of this warning information to the behavior of one or more users of this information or the situation prevailing in the environment of the system. For this, the warning system in inventive manner additionally utilizes a communication unit for communication, via which at least one of the users can express acceptance or declining of the planned change.

Advantageous embodiments and further developments of the invention are described in the dependent claims and the figure.

DETAILED DESCRIPTION OF THE INVENTION

Figure 1:
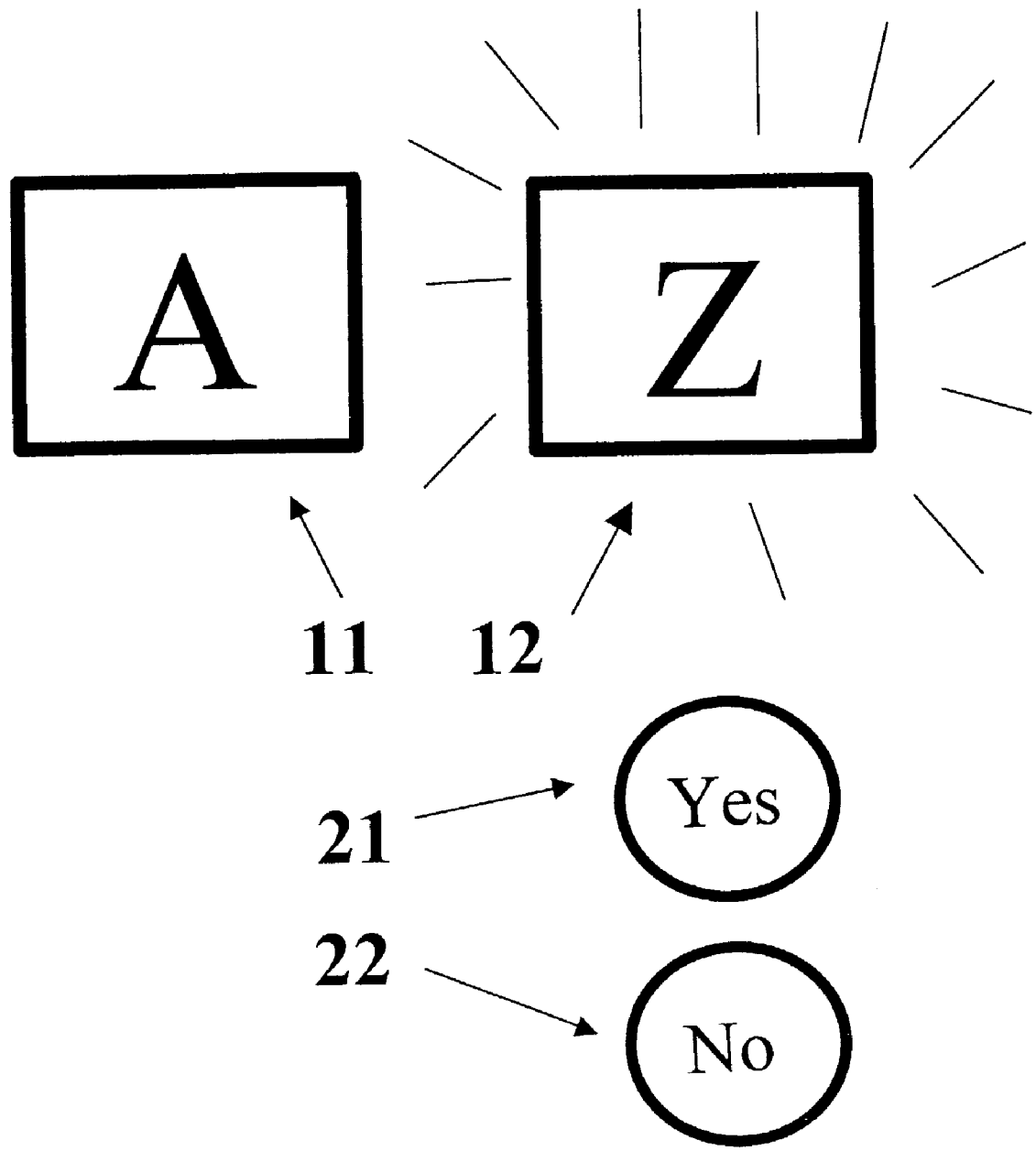
FIG. 1 shows an example of the arrangement for communication between the warning system and a user with optical display elements and selection means with which to accept or decline the planned changes.

In general the warning system will change the mode and manner in which it presents the warning information to a user only when it has received an indication of acceptance to this change within the framework of the communication initiated by the warning system. It is however also conceivable, for those cases in which as a result of no expression of either agreement or declining by any of the users, after expiration of predetermined period of time (for example: 5 seconds) the system carries out these changes in the mode and manner of the warning information. In this manner it can be prevented, that important changes are blocked by the failure of users to pay attention.

In general, no change in the mode and manner of the output of the warning information should occur when a declining of the change is expressed in the framework of the communication between warning system and user. It is however conceivable, in those cases which make it necessary to cause a significantly strong change in the mode and manner of the output of the warning information, that in appropriate manner the declining of the change is at least in part ignored. Such a situation is, for example, in the case of monitoring vehicle steering in which a particularly aggressive manner of driving is recognized; such aggressive drivers tend also to ignore even changes in the warning presentation (for example, more intensive warning signals).

Above all, in urgent cases (for example dangerous situations, which call for a rapid driver reaction) it can be inferred when a communication with the user can be dispensed with. This is particularly in the case when the warning system recognizes that a significant strong change in the mode and manner of the output of the warning information is necessary. In this case it is conceivable in advantageous manner to presume an agreement to the change (implicit assumption of the proposed change), and as a consequence thereof, to carry out the planned change. In particularly preferred manner such an implicit assumption can be presumed, when it is determined using a means for determining the direction of gaze or view of the user, for example using an optical signal, that this cannot confirm or verify the correct direction of gaze, since the field of vision of the operator would in this case be away from the display. This is particularly true in those cases, in which for urgency reasons no time remains for waiting for the user to again directs his attention towards the communication means.

In particular advantageous manner the inventive process can be so designed, that in those cases in which the declining of the changes are at least in part not accepted, or in which the system has autonomously decided to circumvent the communication (interrogating the user), the user recognizes that this has taken place by a change in the mode and manner of the output of the warning information.

In a particularly advantageous manner the communication between the warning system and the user occurs in combination with a speech dialog system. Similarly, as an alternative or as a supplement, the communication can be carried out at least with use of an optical signal means and/or a graphic display element.

At the same time the communication could also involve haptic, olfacotory and/or acoustic communication means. It is for example conceivable to alert or inform the user to a planned change using an acoustic information signal or by shaking or vibrating the steering wheel.

With respect to the design of the inventive device for controlling a warning system, this should in every case have access to a supplemental communication unit besides the unit for adaptation of the mode and manner of the output of this warning information to the behavior of one or more users of this information or to the situation existing in the environment. This communication unit serves in inventive manner for the communication with at least one of the users of the warning information and includes means via which this user can express or input his acceptance or declining with regard to a planned change in the mode and manner of the output of the warning information.

An exemplary arrangement for communication between the warning system and a motor vehicle operator is schematically represented in FIG. 1. The arrangement here involves two optical display elements 11 and 12, shown as rectangular light displays with the indicia A (distance from preceding vehicles) and Z (condition of the roadway). If the warning system is informed, for example, by a system for monitoring of the roadway, that this roadway is increasingly changing towards a condition critical with respect to the safety of the vehicle, then the warning system may consider it to be appropriate to more clearly and/or more rapidly appraise the vehicle operator regarding the changes in conditions. This planned change is communicated in this illustrative example to the vehicle operator by blinking of the display element 12 (indicated by lines around the display element). The vehicle operator can then decide, whether he should accept the planned change by pressing one of the two circular selection means 21 and 22, or decline, whereupon the display element 12 ceasing blinking.

In particularly advantageous manner the invention can be employed, when used in a motor vehicle, to warn the vehicle operator or vehicle occupants in a mode and manner optimally suited to being received by them.

The invention is however not limited to employment with motor vehicle, and can for example also be advantageously employed in any technical field, in which operators or users are to be warned; for example in control stations for monitoring of power plant or rail systems.

The invention claimed is:

1. A process for controlling a warning system of which the mode and manner of output of warning information is dynamically adaptable to the behavior of one or more users of this information or to the situation prevailing in the environment of the system, comprising:

having the system initiate communication with at least one of the users of the information preliminary to a planned change in the mode and manner of the output of warning information, and having the user indicate acceptance or declining of the planned change within the framework of this communication, wherein a change in the mode and manner of the output warning information does not occur when, in the framework of the communication, a declining thereof is indicated, and wherein the declining by at least one of the users is ignored by the system when the warning system has recognized that a significantly stronger change in the mode and manner of the output of the warning information is necessary, or when the user has averted his eyes from the display unit.

2. The process according to claim 1, wherein the change in the mode and manner of the output warning information which is actually carried out is less of a change than initially planned.

3. The process according to claim 1, further comprising:

monitoring the behavior of one or more users or the situation prevailing in the environment of the system for indications of a need for the output of warning information, upon detecting the need for the output of warning information, outputting such warning information at a planned initial mode and manner, and further monitoring the behavior of one or more users or the situation prevailing in the environment of the system for indications of a need for a change in the mode and manner of the output of the warning information, and upon detection of such indications, planning to make such a change in the mode and manner of the output of the warning information.

4. The process according to claim 3, wherein a change in the mode and manner of the output of the warning information occurs when, in the framework of the communication, an acceptance thereto is indicated.

5. The process according to claim 3, wherein neither an acceptance nor a declining of the planned change is indicated by the user within a predetermined time span, and following expiration of the time span, the system carries out the planned change in the mode or manner of the warning information.

6. The process according to claim 3, wherein in the case that the warning system recognizes the need for a significantly stronger change in the mode and manner of the output of the warning information, the acceptance to the change is presumed to have been given by at least one of the users, and as a consequence thereof, the system carries out the planned change.

7. The process according to claim 4, wherein the occurrence of the change in the mode and manner of the output warning information is brought to the attention of the user.

8. The process according to claim 3, wherein the communication involves at least one speech dialog system.

9. The process according to claim 3, wherein the communication involves at least one of an optical signal means and a graphic display unit.

10. A device for controlling a warning system, comprising
a unit for initiating communication with at least one of the users of the information preliminary to a planned change in the mode and manner of the output of warning information, via which communication this user can express acceptance or declining of the planned change in the mode and manner of the output of the warning information, and
a unit for outputting warning information, and
wherein the unit for outputting warning information does not output a chance in the mode and manner of the output warning information when, in the framework of the communication, a declining thereof is indicated, and
wherein the unit for outputting warning information ignores the declining by at least one of the users when the warning system has recognized that a significantly stronger change in the mode and manner of the output of the warning information is necessary, or when the user has averted his eyes front the display unit.

11. The device according to claim 10, wherein the communication unit includes a speech dialog system.

12. The device according to claim 10, wherein the communication means includes at least one of an optical signal means and a graphic display unit.

13. The device according to claim 10, wherein the communication is haptic, olfactory and/or acoustic communication.

14. The device according to claim 10, wherein the warning system further includes a means for detecting the direction of view of at least one of the users.

15. The process according to claim 1, wherein the warning system is an automobile warning system.

16. The process according to claim 1, wherein the warning system is a power station or rail system warning system.

* * * * *